United States Patent

[11] 3,575,619

[72] Inventor Gerald F. Frank
Normal, Ill.
[21] Appl. No. 761,733
[22] Filed Sept. 23, 1968
[45] Patented Apr. 20, 1971
[73] Assignee General Electric Company

[54] DUAL INPUT ELECTRONIC TIMING CIRCUIT WITH RESISTOR TAP SWITCHING CIRCUIT
4 Claims, 2 Drawing Figs.

[52] U.S. Cl. .......... 307/293, 307/246, 307/283, 328/129
[51] Int. Cl. .......... H03k 17/28
[50] Field of Search .......... 307/228, 246, 293, 294, 283; 328/129, 130, 131

[56] References Cited

UNITED STATES PATENTS 3,253,157 5/1966 Lemon, Jr. .......... 307/293X
3,443,124 5/1969 Pinckaers .......... 307/252

*Primary Examiner*—Stanley D. Miller, Jr.
*Attorneys*—Jon Carl Gealow, Arthur A. Fournier, Jr., David M. Schiller, Frank L. Neuhauser, Oscar B. Waddell and Melvin M. Goldenberg

ABSTRACT: An RC timer circuit which is responsive to dual inputs so as to provide an output at a predetermined time interval after a first input and then only upon the occurrence of a second input. The emitter voltage of a unijunction transistor, conduction of which provides the timer output, is provided by an RC timing circuit in which charging of the capacitor begins upon the occurrence of a first input, and which capacitor provides an emitter voltage sufficient to cause conduction of the unijunction transistor after a predetermined time interval. However, an interbase voltage sufficient to permit conduction of the unijunction transistor is supplied only when a transistor connected in series with the first base of the unijunction transistor is caused to conduct upon the occurrence of a second input.

PATENTED APR 20 1971 3,575,619

INVENTOR.
Gerald F. Frank,
BY Jon Carl Gealow
Attorney.

DUAL INPUT ELECTRONIC TIMING CIRCUIT WITH RESISTOR TAP SWITCHING CIRCUIT

BACKGROUND OF THE INVENTION

This invention relates to an electronic timing circuit which will provide an output signal in response to dual input signals. More specifically, it relates to an electronic timing circuit which provides an output signal at a predetermined time interval after the occurrence of a first input, but only upon the occurrence of a second input.

When electronic circuits are used in control systems, it is frequently desirable to provide an electronic timing function. This timing function has in some cases been provided by a sensing circuit responsive to a predetermined voltage appearing across a capacitor in a capacitor-resistance series circuit. By energizing the capacitor-resistor series circuit at a predetermined voltage, the time interval required for the capacitor to charge to the predetermined voltage may be adjusted by adjusting the resistance of the resistor. When the control system in which the electronic timing function is to be provided is utilized in controlling the energization of an electrical load from an AC supply, it is frequently desirable to energize the load for a predetermined number of cycles of the AC supply. If such is the case, a variable resistance may be provided in the capacitor-resistance series circuit which is calibrated in terms of cycles. In some such applications, it may be desirable to synchronize the timing function with the AC supply being controlled. More particularly, it may be desirable for the electronic circuit providing the electronic timing function to provide an output indicative of the elapse of a predetermined time interval following a first input signal only at the beginning of a cycle of the AC supply. For instance, in a welder energized by an AC supply, it is desirable to time functions in a welding sequence in terms of an integral number of cycles.

OBJECTS OF THE INVENTION

It is therefore an object of this invention to provide a novel and improved circuit performing an electronic timing function which is responsive to dual inputs.

It is another object of this invention to provide a novel and improved circuit performing an electronic timing function which is responsive to a first input to provide an output at a predetermined time interval thereafter, but then only upon the occurrence of a second input.

It is a further object of this invention to provide an electronic timing circuit having dual inputs, one of which inputs provides absolute synchronization with an alternating current supply, such that the predetermined timed period is an integral number of cycles.

SUMMARY OF THE INVENTION

The foregoing objects are accomplished in accordance with this invention, in one form thereof, by providing an electronic timing circuit, energized by a direct current supply, including therein a first semiconductive device, such as a unijunction transistor, having at least two base terminals and an emitter terminal. This first semiconductive device normally exhibits a high impedance characteristic between a first of its base terminals and its emitter terminal, and exhibits a low impedance characteristic between the first base and emitter terminals to provide an output from the timing circuit when two inputs are provided to the timing circuit. The emitter voltage of the first semiconductive device is derived from the charge on a timing capacitor in a series resistance-capacitance timing circuit connected to be energized by the direct current supply. A circuit, including a normally conducting transistor, normally prevents the charging of the timing capacitor but in response to a first input the transistor stops conducting to permit the timing capacitor to be charged through the timing resistor. A second semiconductive device connected with a pair of terminals in series with the first base of the first semiconductive device normally exhibits a high impedance characteristic between the pair of terminals to limit the interbase voltage of the first semiconductive device to less than the minimum voltage necessary for it to conduct from emitter to first base. The second semiconductive device is caused to exhibit a low impedance characteristic between the pair of terminals in response to receiving a second input at a third terminal, whereupon the interbase voltage of the first semiconductive device exceeds the minimum voltage necessary for it to conduct. If a first input has been applied to permit the charging of the capacitor such that the emitter voltage of the first semiconductive device is at least a predetermined fixed fraction of the interbase voltage, the first semiconductive device will conduct to provide an output from the timing circuit.

DESCRIPTION OF THE PREFERRED EMBODIMENT

Figure 1:
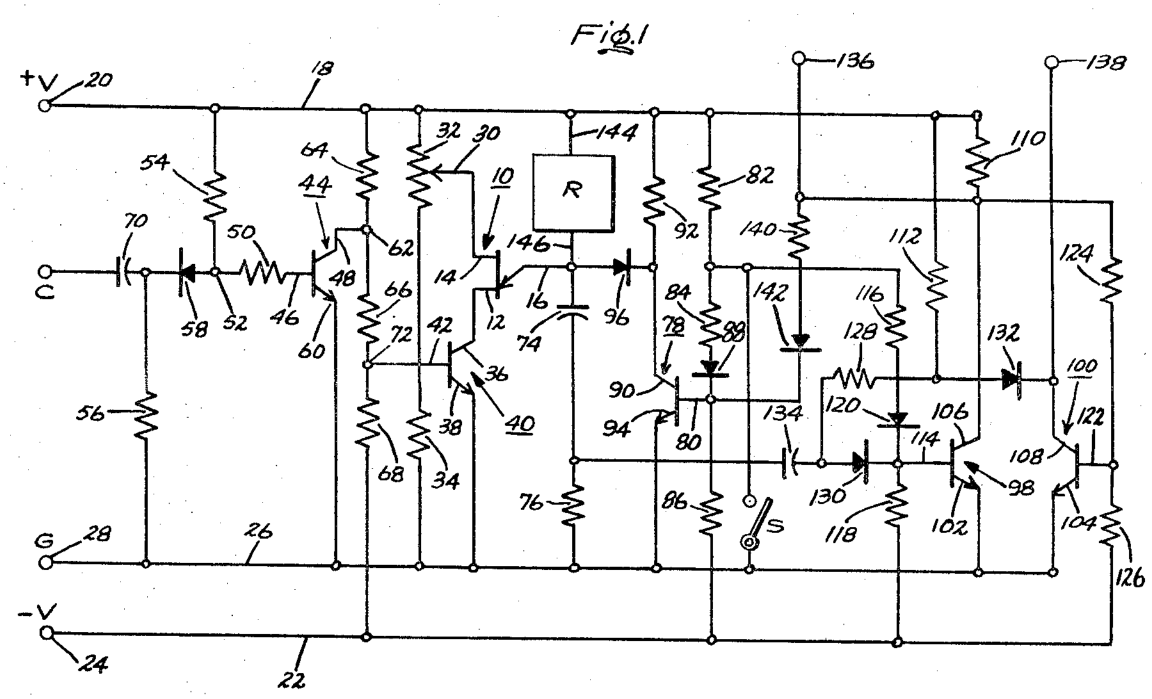
FIG. 1 is a circuit diagram illustrating an embodiment of this invention providing a synchronized output from a resistance-capacitance timer.

Referring to the circuit diagram of FIG. 1, one embodiment of a synchronized timer circuit will be described. This timer circuit, which may also be referred to as a timer having dual inputs, utilizes a semiconductor device, shown as a unijunction transistor to combine the dual inputs in order to provide an output responsive to the dual inputs. A unijunction transistor will exhibit a very low impedance between its emitter and its first base when the emitter voltage reaches a fixed fraction of the applied interbase voltage.

Thus, in applying the dual inputs to the unijunction transistor, a first one of the inputs controls the applied interbase voltage, and a second one of the inputs controls the voltage supplied to the emitter. The first input, which controls the applied interbase voltage, is derived from a first electrical signal applied to input terminal C, and the second input, which controls voltage supplied to the emitter, is generated within the synchronized timer circuit at a predetermined interval after the closing of switch S.

The unijunction transistor (UJT) 10 has a first base electrode 12, a second base electrode 14, and an emitter electrode 16. The interbase and emitter voltages of the UJT 10 are derived from a positive voltage *V* applied to bus 18 through terminal 20 and a negative voltage *V* applied to negative bus 22 through terminal 24. The positive voltage *V* applied to positive bus 18 and the negative voltage *V* applied to negative bus 22 are both established with respect to a ground bus 26 having a terminal 28. The interbase voltage applied to the UJT 10 is derived as a portion of the voltage *V* on positive bus 18 through a tap 30 of a potentiometer 32 which is connected in series with a resistor 34 between the positive bus 18 and the ground bus 26. The voltage derived at tap 30 is applied to the second base 14 of UJT 10, while the first base 12 is connected in series with the collector 36-emitter 38 circuit of a transistor 40 to the ground bus 26. With the transistor 40 in its nonconductive state, the collector 36-emitter 38 circuit of transistor 40 represent a high impedance, such that the UJT 10 will not conduct.

In the preferred embodiment of this invention, it is desirable for the UJT 10 to begin conducting only at the leading edge of an AC power voltage which is utilized to energize a device, the energization of which is controlled by the synchronized timer of this invention. In order to insure that the UJT 10 begins conducting only at the leading edge of a pulse, a differentiating circuit means is provided wherein upon the application of clock pulses to terminal C, very short voltage pulses are applied to base 42 of transistor 40 at the leading edge of each clock pulse. The short pulse applied to the base 42 of transistor 40 is formed by a differentiating circuit including a transistor 44, which in the absence of the application of a clock pulse to terminal C has its base 46 and collector 48 voltages established by resistance dividers connected between the positive bus 18 and the ground bus 26 which maintain it in its conductive state. The voltage applied to the base 46 is applied through a resistor 50 from a junction point 52 in a resistance voltage divider which includes a pair of resistors 54 and 56 and a diode 58. Emitter 60 of transistor 44 is connected to the ground bus 26, while the collector 48 is connected to a junction point 62 between resistors 64 and 66 which resistors are connected in series with a resistor 68 between positive bus 18 and the negative bus 22.

Reviewing the operation of the differentiating circuit, upon the application of a clock pulse to the terminal C, the leading edge of the clock pulse is differentiated by a capacitor 70 and associated circuitry, to establish a very short pulse voltage on the base 46 of transistor 44. This pulse stops the conduction of transistor 44, such that the voltage at junction point 72, which is connected to the base 42 of transistor 40, raises to a level sufficient to cause conduction of transistor 40 between its collector 36 and emitter 38 for a very short interval. Thus, transistor 40 is caused to conduct for only a very short interval at the leading edge of a clock pulse applied to the terminal C. Should the voltage applied to the emitter 16 of UJT 10 be sufficient to cause conduction of UJT 10, such conduction will only be initiated at the leading edge of a clock pulse applied to terminal C.

The voltage of emitter 16 of UJT 10 is established by an RC timing circuit connected between the positive bus 18 and the ground bus 26. The RC timing circuit which provides the second input includes as an adjustable timing resistor, a resistor tap switching circuit R, a timing capacitor 74, and a pulse forming resistor 76. Charging of the timing capacitor 74 is controlled by the conductive state of a transistor 78, the conductivity of which is in turn determined by the switch S. The voltage applied to base 80 of transistor 78 is established by a resistance voltage divider connected between the positive voltage bus 18 and the negative voltage bus 22. This voltage divider comprises serially connected resistors 82, 84, and 86 and a diode 88. Collector 90 of transistor 78 is connected to the positive bus 18 through a resistor 92, while emitter 94 is connected directly to the ground bus 26. The collector 90 of transistor 78 is also connected to the junction of emitter 16 of UJT 10, the resistor tap switching circuit R and the timing capacitor 74 by a diode 96.

With the switch S in its normally open position, the voltage divider comprising resistors 82, 84, and 86 establishes a base voltage on transistor 78 such that it conducts from collector 90 to emitter 94, thereby conducting current through diode 96 from the junction of the resistor tap switching circuit R and the timing capacitor 74 to prevent charging of timing capacitor 74. The charging of capacitor 74 through the resistor tap switching circuit R is commenced by the closing of switch S. Closing switch S reduces the voltage at the junction of resistors 82 and 84 to ground potential, thereby reducing the voltage applied to base 80 of transistor 78, causing the transistor to stop conducting and thereby to permit charging of the timing capacitor 74 through resistor tap switching circuit R.

The resistance of the resistor tap switching circuit R is adjusted such that the timing capacitor 74 is charged to a predetermined voltage, which is a fixed fraction of the interbase voltage applied to the UJT 10, wherein the UJT 10 will conduct from emitter 16 to first base 12 after the lapse of a predetermined time period. When the charge on timing capacitor 74 has reached the predetermined voltage, the next time a clock pulse is applied to terminal C, such that the transistor 40 is caused to conduct for a short interval of time, the UJT 10 will conduct from emitter 16 to first base 12, thereby discharging timing capacitor 74 through pulse forming resistor 76. Thus, a pulse is provided across pulse forming resistor 76 at a predetermined time interval after the closing of switch S, and only at the leading edge of a pulse applied to terminal C.

In the particular embodiment of the invention shown in FIG. 1, the output pulse formed across the pulse forming resistor 76 is utilized to control the conductive state of a transistor flip-flop output circuit. The transistor flip-flop output circuit includes a pair of transistors 98 and 100 having their emitters 102 and 104 respectively connected to the ground bus 26.

The collectors 106 and 108 of transistors 98 and 100 respectively are connected to the positive bus 18 through resistors 110 and 112 respectively. The voltage applied to base 114 of transistor 98 is established by a resistance voltage divider connected between the positive voltage bus 18 and the negative voltage bus 22. This voltage divider comprises serially connected resistors 82, 116, and 118 and a diode 120. Similarly, the voltage of base 122 of transistor 100 is established by a resistance voltage divider comprising resistors 110, 124, and 126 connected between the positive voltage bus 18 and the negative voltage bus 22. To complete the flip-flop circuit, the base 122 of transistor 100 is connected by resistor 124 to the collector 106 of transistor 98 and similarly the base 114 of transistor 98 is connected through a resistor 128 and diodes 130 and 132 to the collector 108 of transistor 100.

Considering now the operation of the transistor flip-flop output circuit, with the switch S in its normally open position, a reset signal is applied to the base 114 of transistor 98 through resistors 82, 116, and diode 120, thus maintaining transistor 98 in conduction and transistor 100 nonconducting. The closing of switch S removes the reset signal to the base 114 of transistor 98, but it is maintained in conduction by the bias voltage supplied through resistors 112 and 128.

The output pulse developed across the pulse forming resistor 76 is transmitted through a capacitor 134 to turn transistor 98 off and to thereby cause transistor 100 to conduct, the "on" condition of the flip-flop circuit. The output from the transistor flip-flop output circuit is realized at terminals 136 and 138. Terminal 136 being grounded by the conduction of the transistor 98 and terminal 138 being held at the positive supply voltage when the flip-flop circuit is in the reset condition. The electrical condition of terminals 136 and 138 are reversed when the output pulse is provided by the conduction of UJT 10.

In order to insure the complete discharge of capacitor 74 even after UJT 10 has stopped conducting, a feedback circuit including resistor 140 and a diode 142 are connected in series between the output terminal 136 and the base 80 of transistor 78 to provide a base signal to transistor 78 to cause it to conduct to discharge capacitor 74.

In a particular application it is desirable to use the synchronized timer circuit set forth in FIG. 1 to provide timing for a time range of 1 through 99 cycles of the AC power voltage. The resistor tap switching circuit R is designed such that with a given capacitance of the timing capacitor 74 such a timing range is realized. For maximum accuracy of the synchronized timing circuit of FIG. 1, it is desirable that the UJT 10 reach its trigger voltage, which is a fixed fraction of the applied interbase voltage, one-half cycle ahead of the particular setting of the resistor tap switching circuit R. UJT 10 will then trigger when the clock pulse occurs one-half cycle later at the beginning of an integral cycle. Thus, the variation in time permitted for the triggering voltages to be reached is just under plus or minus one-half cycle without introducing an error between the timer timeout i.e. timing of UJT 10, and the timer setting established by resistor tap switching circuit R.

Figure 2:
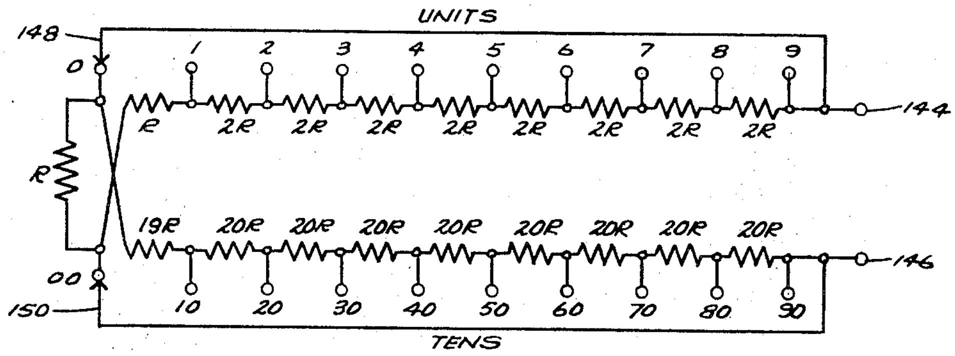
FIG. 2 is a circuit diagram illustrating an embodiment of a resistor tap-switching circuit used in the circuit shown in FIG. 1.

Referring to FIG. 2, the resistor tap switching circuit R is provided with two terminals, 144 which is connected to the positive bus 18, and 146 which is connected to the junction of capacitor 74 and emitter 16 of UJT 10. The resistor tap switching circuit R is further provided with two ten position selector switches, one of which is labeled UNITS and the other TENS. By moving the movable contactor 148 of the UNITS selector switch, a resistance value between terminals 144 and 146 may be chosen such that the UJT 10 begins conducting 1, 2, ... 9 cycles after the closing of switch S. Similarly, the movable contactor 150 of the TENS selector switch may be moved to the various taps to provide the necessary resistance between terminals 144 and 146 for the UJT 10 to begin conducting at 1, 10, 20, ... 90 cycles after the closing of switch S. The values of the resistors included in the resistor tap switching circuit are chosen such that with the resistors connected between the taps 0 and 00, and between 00 and 1 having a resistance value of R, the other resistors will have a resistance of multiples of R as shown in FIG. 2. That is, the resistors between the taps 1 and 2, 2 and 3, ... 8 and 9 will have a resistance value of 2R, the resistor between the taps 0 and 10 will have a resistance value of 19R, while those between taps 10 and 20, 20 and 30, ... 80 and 90 will have a resistance value of 20R.

Wherein, the timer range desired is 1—99 cycles, the (0-—00) switch setting would provide the proper resistance for one-half cycle charging to trigger voltage of timing capacitor 74 just as a 00—1 switch setting should.

Referring to FIG. 2, it will be observed that for both the 0-—00 and the 00—1 setting, a resistance value R is provided between terminals 144 and 146. This resistance value R is chosen such that timing capacitor 74 is charged to the triggering voltage of UJT 10 one-half cycle after the closing of switch S. For each additional cycle up through 9 cycles, as the movable contact 148 is moved from the 1, 2 ... 8, 9 taps an additional resistance value of 2R is added between the terminals 144 and 146. Since the resistance value of 2R is double the value of R, which provides one-half cycle timing, the timing capacitor 74 is charged to the triggering voltage at 1½, 2½, 3½, ... up to 8½ cycles after the closing of switch S. With the UNITS movable contact 148 in the 0 position, and the TENS movable contact 150 moved to the 10 tap, a resistance value of 19R is provided between terminals 144 and 146 which is a resistance value 2R greater than that provided with the UNITS movable contact 148 at the 9 tap.

Continuing, since each 2R resistance value added between terminals 144 and 146 increases the timing provided by timing capacitor 74 1 cycle, the resistance values of 20R connected between the taps 10 and 20, 20 and 30, etc., each add 10 cycles to the timing provided by timing capacitor 74. Thus, for example, with the UNITS movable contact 148 in the 0 position and the TENS movable contact 150 at the 40 tap, a resistance value of 79R or a timing of 39½ cycles is provided.

While a particular embodiment of this invention has been shown and described, it will be obvious to those skilled in the art that various changes and modifications may be made without departing from this invention in its broader aspects and, therefore, it is intended that the appended claims cover all such changes and modifications as fall within the true spirit and scope of this invention:

I claim:

1. An electronic timing circuit energized from a direct current supply which is responsive to at least two inputs and wherein the timing function is synchronized with an AC supply voltage comprising:

a. a series resistance-capacitance circuit including a timing resistance and a timing capacitor connected to be energized by the direct current supply such that said timing capacitor is charged through said timing resistance from the direct current supply;

b. said timing resistance comprising a presettable resistor tap switching circuit whereby a variable timing interval in predetermined cycle increments may be selected;

c. a first circuit means normally preventing the charging of said timing capacitor through said presettable resistor tap switching circuit and permitting the charging of said timing capacitor through said presettable resistor tap switching circuit in response to a first input;

d. said first circuit means including a transistor which normally conducts to prevent the charging of said timing capacitor and which in response to said first input stops conducting to permit the charging of said timing capacitor;

e. a unijunction transistor having two base terminals and an emitter terminal, said base terminals connected to be energized by said direct current supply to establish an interbase voltage, said unijunction transistor normally exhibiting a high impedance characteristic between a first of said base terminals and said emitter terminal, and exhibiting a low impedance characteristic between said first base terminal and said emitter terminal when said interbase voltage exceeds a predetermined voltage, and said emitter voltage is at least a predetermined fixed fraction of said interbase voltage;

f. means connecting said emitter terminal to said timing capacitor such that said emitter voltage is established by the charge on said timing capacitor;

g. a semiconductive device having a pair of terminals connected in series with said first base of said unijunction transistor, said semiconductive device normally exhibiting a high impedance between said pair of terminals and exhibiting a low impedance between said pair of terminals in response to receiving a second input at a third terminal, such that said interbase voltage of said unijunction transistor exceeds said predetermined minimum voltage only when said semiconductive device exhibits a low impedance between said pair of terminals, said unijunction transistor exhibiting a low impedance characteristic between said first base terminal and said emitter terminal to provide an output from the timing circuit a predetermined time after a first input permits the charging of said timing capacitor to commence, and when said semiconductive device exhibits a low impedance in response to receiving a second input at its third terminal;

h. a differentiating circuit connected to receive clock pulses from said AC supply voltage and to provide very short pulses coincident with the beginning of a cycle of the AC supply as said second input to said third terminal of said semiconductive device whereby said unijunction transistor will commence to exhibit a low impedance between said first terminal and said emitter terminal to provide an output only at the beginning of a cycle of the AC supply; and i. a transistor flip-flop output circuit, the transistors of said flip-flop output circuit normally being maintained in the reset condition and being switched to the "ON" condition when said unijunction transistor exhibits a low impedance characteristic.

2. An electronic timing circuit as defined in claim 1 wherein:

a. said presettable resistor tap switching circuit is adjustable to provide a variable timing interval adjustable in increments of the period of one cycle of AC supply; and b. said emitter voltage of said unijunction transistor reaches said predetermined fixed fraction of said interbase voltage approximately one-half cycle ahead of the desired cycle count whereby said unijunction transistor will commence to exhibit a low impedance between said first base terminal and said emitter terminal to produce an output at the beginning of the desired cycle of the AC supply.

3. An electronic timing circuit as defined in claim 2 wherein said presettable resistor tap switching circuit comprises two multiposition selector switches and resistors connected in an arrangement whereby a variable timing interval of 1 through 99 cycles in one cycle increments may be selected.

4. An electronic timing circuit as defined in claim 3 comprising in addition:

a. a feedback circuit from said flip-flop output circuit to said transistor; and b. said feedback circuit providing a signal to said transistor when said flip-flop output circuit is in the "ON" condition to cause said transistor to conduct to complete the discharge of said timing capacitor.